United States Patent [19]

Heckethorn et al.

[11] Patent Number: 4,958,419
[45] Date of Patent: Sep. 25, 1990

[54] DUAL LOOP HOSE CLAMP

[75] Inventors: John E. Heckethorn, Dyersburg; Danny J. Whittle, Newbern, both of Tenn.

[73] Assignee: 3900 Corp., Baltimore, Md.

[21] Appl. No.: 829,224

[22] Filed: Feb. 14, 1986

Related U.S. Application Data

[63] Continuation of Ser. No. 581,122, Feb. 17, 1984, abandoned.

[51] Int. Cl.$^5$ .................................................. A44B 1/04
[52] U.S. Cl. ........................................ 24/283; 24/275; 24/279; 24/280
[58] Field of Search .................. 24/283, 275, 279, 280, 24/19, 20 LS, 284, 27-29; 411/386

[56] References Cited

U.S. PATENT DOCUMENTS

| | | | |
|---|---|---|---|
| 492,855 | 3/1893 | Weidaw | 24/283 X |
| 1,275,091 | 8/1918 | Richardson | 24/283 |
| 1,468,297 | 9/1923 | Hogg et al. | 24/283 |
| 1,909,476 | 5/1933 | Trotter | 411/386 |
| 2,002,671 | 5/1935 | McLaughlin | 24/283 |
| 2,349,809 | 5/1944 | Black | 24/283 |
| 2,536,612 | 1/1951 | Murray | 24/283 |
| 2,561,635 | 7/1951 | Prochaska | 24/283 |
| 3,125,923 | 3/1964 | Hanneman | 411/386 |
| 3,722,041 | 3/1973 | Munse | 24/283 |
| 3,724,315 | 4/1973 | Sygnator | 411/386 |
| 4,414,715 | 11/1983 | Anjos et al. | 24/283 |

FOREIGN PATENT DOCUMENTS

| | | | |
|---|---|---|---|
| 1532461 | 5/1967 | France | 24/283 |
| 548845 | 10/1942 | United Kingdom | 24/283 |

Primary Examiner—Laurie K. Cranmer
Attorney, Agent, or Firm—Dennison, Meserole, Pollack & Scheiner

[57] ABSTRACT

A lightweight very low-profile hose clamp formed from only three pieces: an elongated wire bent to form a pair of loops which are in spaced side-by-side arrangement and joined at the top by an integral nut section formed by one and one-half tight convolutions of the wire; a heavy gage steel actuating plate having three holes therein, the ends of the wire being bent rearwardly toward the nut section and passing through the end holes of the plate; and an actuating screw threadedly received in the nut section and having a pilot tip received in the central hole of the plate.

9 Claims, 1 Drawing Sheet

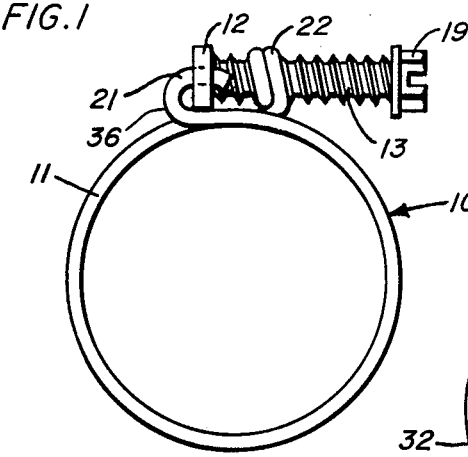
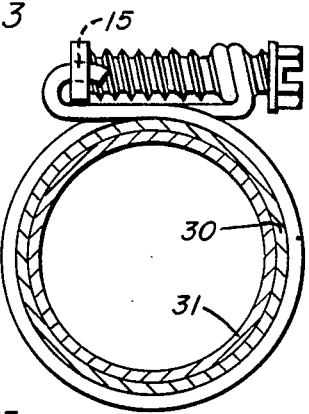
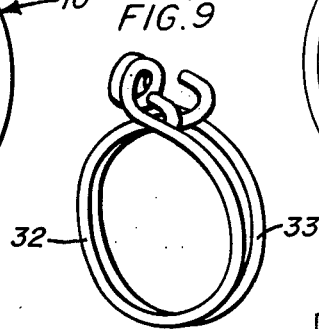
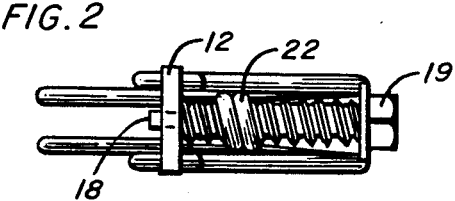
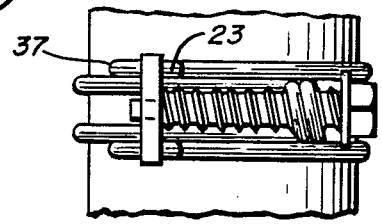
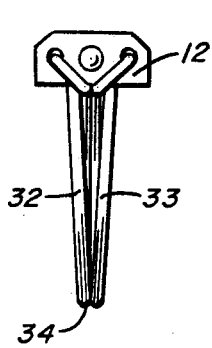
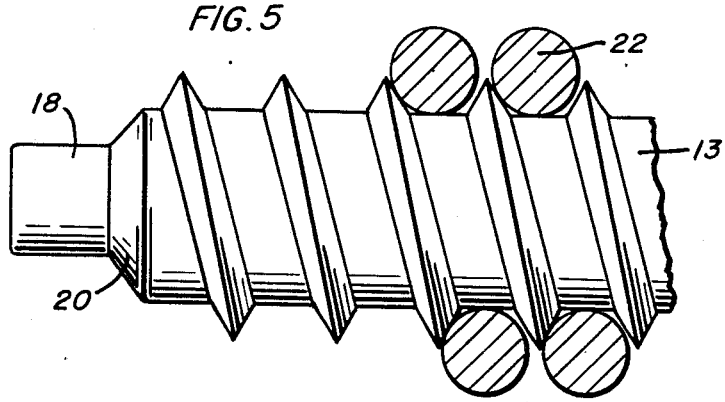
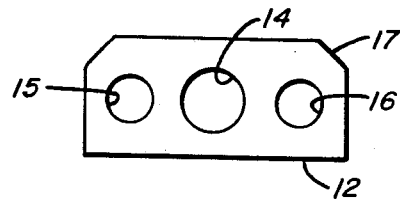
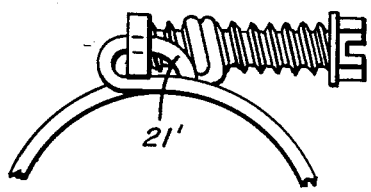
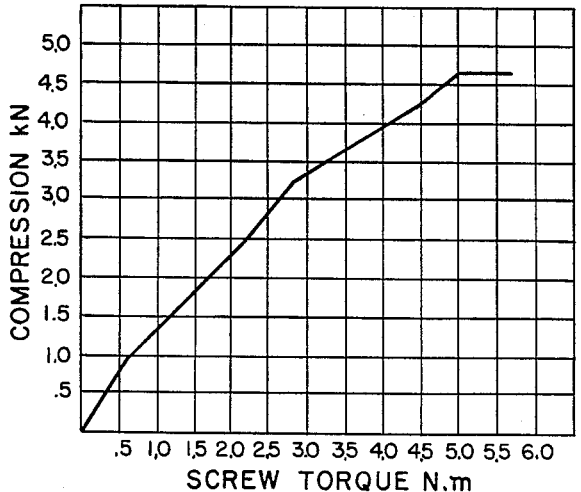

DUAL LOOP HOSE CLAMP

This is a continuation of copending application Ser. No. 581,122, filed Feb. 17, 1984 now abandoned.

BACKGROUND OF THE INVENTION

The field of the present invention is the art of ring-type hose clamps that are employed for holding and securing sections of elastomeric tubing in telescoped connection with metal or plastic tubes or pipes. Such devices are frequently employed in the various engine systems of automotive vehicles powered by internal combustion or diesel engines. Such hose clamps find utility in radiator and heater hose attachment, securing of pollution control equipment and attachment of air or breather lines. The most common type of clamp in use today for such applications is the well-known slotted band clamp wherein a screw or worm member has threaded engagement with the slots of a circular band which is received immediately therebelow and in threaded engagement therewith. These devices are exceptionally expensive to manufacture and frequently require a second tightening to effect a tight seal. The end portion of the band may extend a considerable distance beyond the housing and catch on clothing and tools and is unsightly. Another popular wire loop clamp is shown in Anjos et al, U.S. Pat. No. 4,414,715 wherein the end portions of the wire extend a considerable distance from the outer circumference of the hose and present a hazard and source of irritation to installation personnel, as the sharp ends cause cuts to individuals working in the engine compartment and to wiring harness.

Many attempts have been made to design a secure leak-proof form of clamp for hoses utilizing a minimum number of parts which are inexpensive to manufacture. Attention is directed to the ring-clamp of Munse shown in U.S. Pat. No. 3,722,041 of Mar. 27, 1973. In this construction a single length of wire is formed into a circle with the ends bent at right angles outwardly and a screw member is inserted through a hole in one of the ends and is in threaded engagement with the other end. Tightening of the screw will of course serve to tighten the ring around the tube or hose captured therein, but the instability and weakness of such a clamp renders it useless for most applications.

The 1893 Weidaw U.S. Pat. No. 492,855, was an early form of hose clamp utilizing a single piece of wire and a nut and bolt. This arrangement required soldering or brazing the ends of the wire together. A single loop of wire is utilized to receive the screw pilot. Devices of this type have been found to be completely ineffective from a performance standpoint since the wires are placed directly in line. Accordingly, there is a void in the area of engagement where no effective sealing can take place. Further, the pilot end of the screw will serve to penetrate the coiled section and the coiled section which acts as a nut flares outwardly to meet the loops. This arrangement will yield at very low torque.

A somewhat similar arrangement is shown in the Black U.S. Pat. No. 2,349,809 of May 30, 1944, which with slight modifications is presently being used on many automobiles imported from Japan. This construction does not apply adequate pressure at the cross over points of the wire and high screw torque, due to washer friction, thread friction, and the loop cinching against the screw pilot causes the threaded plate to follow the screw rotation. This serves to lift one loop at the cross over point and negates the seal.

Another early simplified hose clamp is shown in Schroeder, U.S. Pat. No. 1,432,572 of Oct. 17, 1922, which utilizes hooked ends extending through an actuating plate. Here a pocket is used to accept the end of the screw. The screw itself is not provided with a pilot point and the wires themselves are below the center line of the screw.

Yet another arrangement is shown in the U.S. Pat. No. 2,561,635 issued to Prochaska on Jul. 24, 1951. This arrangement is quite similar to the Black construction, supra, but requires a single welded loop of wire. Note that the screw center is substantially elevated from the hose.

OBJECTS OF THE PRESENT INVENTION

The present invention has for a principal object the provision of an improved and relatively inexpensive hose clamp which is formed in a simplified three piece construction.

Another object of the invention is to provide an inexpensive hose clamp which during tightening provides a smooth snag-free surface due to the low profile actuating section made possible by a unique integral wire nut. It is another object of the invention to provide a simplified hose clamp which eliminates excessive elements, such as a washer and the necessity for providing a tapped hole in an actuating plate thereby resulting in cost savings.

Yet another object of the invention is the provision of an inexpensive hose clamp which may be manufactured utilizing automatic wire forming and automatic assembly equipment.

Another object of the invention is the provision of a wire type hose clamp which develops a very high compressive force and which applies sufficient pressure in the overlap area to avoid leakage.

Further objects and advantages of the invention will be apparent from a consideration of the following specification and drawings.

DESCRIPTION OF THE DRAWINGS

FIG. 1 is a front elevation of our new hose clamp in its fully open condition;

FIG. 2 is a top view of the clamp in FIG. 1;

FIG. 3 is a front elevation of the clamp of FIG. 1 shown in its fully tightened condition on a hose line connection;

FIG. 4 is a top view of the clamp shown in FIG. 3;

FIG. 5 is an enlarged partially sectional view of the pilot tip portion and the distal end of the actuating screw passing through the coiled wire nut;

FIG. 6 is a front elevation of the actuator plate;

FIG. 7 is a plot of screw torque versus hose compression for a two inch dual loop clamp made according to our invention, and FIG. 8 is a partially cut away front elevation of a modified form of our hose clamp.

FIG. 9 is a reduced front perspective view of a further modified form of our hose clamp with the screw and actuating plate removed.

FIG. 10 is a side elevation of the further modified hose clamp of FIG. 9 with the screw and actuating plate included.

DETAILED DESCRIPTION

The invention herein disclosed is shown generally at 10 and is formed as an assembly of only three parts: a double loop wire 11 with integral nut, a heavy gage steel actuating plate 12, and a wide pitch actuating screw 13. These elements are shown in the open position of the hose clamp in FIG. 1. Actuating plate 12 is provided with a central screw pilot hole 14 which in one preferred form of the invention is 3.8 mm in diameter. On either side of the pilot hole 14 are two wire hook retaining holes 15 and 16, which in the basic form of the invention depicted, are approximately 3.2 mm in diameter. In order to avoid sharp edges which may cause injury or snagging in use, the corners of the plate are chamfered as shown at 17.

The 6.0 mm actuating screw 13 is provided with a wide pitch, for example, a 2.5 mm thread pitch. A 5.0 mm screw has been found effective for small applications and the tip end is provided with a pilot tip as shown at 18. The proximal end of the screw member may preferably be formed with a hexagonal slotted head 19 which may have an integral washer as shown. A conical actuating shoulder 20 is shown in FIG. 5 leading from the screw body to the pilot tip. This shoulder of approximately 45° will act against the front face of the steel actuating plate 12 when the pilot tip 18 is inserted into the plate pilot hole 14. It provides for slight misalignment, reduces contact area. Ideally, pilot tip 18 should have a diameter slightly less than the hole 14, as for example, 3.6 mm.

The double loop wire 11 which constitutes the main body of the clamp 10 commences from a hooked end 21 which passes through the hook retaining holes 15 of the plate 12. In the modified form of the invention shown in FIG. 8, the hooked end is bent downwardly into or in near engagement with the first portion of the loop as at $21^1$. The wire then passes through a transition portion 36 and continues through one complete revolution passing inside of the already formed loop and in contact or very close therewith at the top so that there is a slight overlap as shown in FIG. 1. The wire is then bent sharply upwardly and is formed with a double spiral having the same pitch as the screw as shown at 22 providing a snug fit between the wire and the minor diameter of the screw. This portion of the double loop wire acts as an integral nut. A short bend connecting the coiled nut section 22 and large wire loop is important for optimum clamp performance. A bend radius of less than the wire diameter has been found to be acceptable. The actual angular extent of the "double spiral" is about 540°, or 1.5 turns. It will be noted that the second convolution of the wire is inside of and toward the actuating plate from the first and the wire then is bent sharply forward and defines a second complete loop terminating in another transition portion 37 and the hooked end 23 which is retained within the hook retaining hole 16 of the actuating plate 12. This end may also, if desired, be bent downwardly as at $21^1$ in FIG. 8.

It will be noted that the coiled nut section 22 serves as a connecting portion between, and is confined on each side by the outer loops as clearly shown in FIGS. 2 and 4. Further, the screw maintains line contact with the wire coils 22 as clearly shown in FIG. 5 providing smooth, consistent tightening. There are no loose wire ends to slip or snag, and since in the modified FIG. 8 form the ends of the hooks are bent downwardly, accidental dislodging of the double loop wire 11 from the actuating plate 12 is prevented in shipment or rough handling. The clamp may also be removed from the hose and reinstalled if desired.

A typical joint comprising a rubber hose 30 and a metal tube 31 is shown in FIG. 3 with our clamp 10 tightly secured thereover.

The graph in FIG. 7 shows typical performance factors wherein screw torque in Newton Meters (N.m) has been plotted against hose compression readings in Kilonewtons (kN). These figures were derived from tests performed with a 51.0 mm clamp made according to the present invention.

Comparative testing has shown that a typical available Japanese clamp somewhat similar to that shown in the Black U.S. Pat. No. 2,349,809, develops a compressive force of 1.62 kN at a screw torque of 3.95 N.m at which point the actuating plate twists and becomes ineffective.

A further comparative test was made against a clamp manufactured by Murray Manufacturing Company as shown in U.S. Pat. No. 4,414,715. This particular clamp develops a compressive force of 3.10 kN at 7.90 Nm of screw torque. At this point the screw ran out of threads due to wire slippage. This type clamp frequently fails to apply adequate pressure in the overlap area, as the loops do not encompass the overlap area. A clamp made in accordance with the present invention will develop compressive force of 3.3 kN at a screw torque of 3.0 N.m which applies a very uniform compression to the hose even in the overlap area.

The construction of the clamp as set forth herein provides a clamp which can produce compression values exceeding 1,000 pounds which were previously impossible with this class of wire clamp. The combination of the coiled nut section connecting to the loops by tight 90° bends nested snugly inside that section and the use of a heavy actuating plate with the three holes on a common center line coupled with the wide pitch screw which prevents the coiled section from shrinking under tension results in the improved performance. The entire configuration has an exceedingly low profile compared to the prior art with the screw located quite close to the hose about which it is secured. This prevents "lifting" of the loops in the wire overlap area.

In those cases where clearance at the bottom end of the clamp is critical, the width of the double loop arrangement can be reduced as shown in FIGS. 9 and 10. Here the loops 32 and 33 may be brought into contact or close proximity at their bottoms as at 34. In order to utilize the same type of actuating plate 12, the hooked ends 21 are bent outwardly approximately 45° from the vertical as seen in FIG. 10 so that they can pass through the apparatus 15 and 16. As will be seen in FIG. 9, the hooked ends are located inwardly of loops 32 and 33.

Various methods of manufacture of the present clamp utilizing presently existing machinery and preferrably automatic wire forming machines will be apparent to those skilled in the art.

We claim:
1. A low profile hose clamp comprising:
 (a) a single length of wire curved upon itself to form a pair of laterally spaced hose encircling loops, and comprising the following portions, in sequence:
  (1) a first unattached end portion;
  (2) a first transition portion;
  (3) a first loop portion;
  (4) a connecting portion bent to define a coiled, screw-receiving nut section of approximately one and one-half turns, and having a longitudinal axis;

(5) a second loop portion laterally spaced from said first loop portion;

(6) a second transition portion; and (7) a second unattached end portion; said transition portions and said loop portions being in close overlapping association;

(b) an actuating plate having at least two spaced holes therein in a plane normal to the longitudinal axis of said nut section, each of said unattached end portions being bent backwardly toward said nut section and received within one of said holes in the actuating plate; and (c) a large diameter actuating screw having shallow, widely spaced flat-bottom threads, said screw passing through and in threaded engagement with said nut section, one end of said screw engaging against said actuating plate between the holes therein.

2. A low-profile hose clamp as set forth in claim 1 and further including a central aperture in said actuating plate centrally located between said holes, and said actuating screw having a pilot tip on the said one end which is received within said aperture.

3. A low-profile hose clamp as defined in claim 2, wherein a conical shoulder joins said pilot tip to the main body of the actuating screw.

4. A low-profile hose clamp as defined in claim 2, wherein the diameter of said aperture is greater than the diameter of said holes in the actuating plate.

5. A low-profile hose clamp as defined in claim 1 wherein the ends of the wire are bent fully down into contact with their adjacent loop to prevent separation from said actuating plate.

6. A low-profile hose clamp as defined in claim 1 wherein a bend is formed in said wire joining said loops and said nut section, said bend having a radius of less than the wire diameter.

7. A low-profile hose clamp as defined in claim 1 wherein the inside diameter of the coiled screw receiving nut section is approximately equal to the minor diameter of said actuating screw.

8. A low-profile hose clamp as set forth in claim 1, wherein the lower ends of the pair of loops are in close proximity and said ends of the wire which are bent backwardly are also bent outwardly with respect to each other.

9. A low-profile hose clamp as set forth in claim 8, wherein the ends of the wire are inboard of the loops.

* * * * *